United States Patent [19]

Crook

[11] Patent Number: 4,532,461

[45] Date of Patent: Jul. 30, 1985

[54] ROTOR POSITION SENSOR ERROR DETECTION

[75] Inventor: James C. Crook, Raleigh, N.C.

[73] Assignee: Kollmorgen Technologies Corporation, Dallas, Tex.

[21] Appl. No.: 547,638

[22] Filed: Nov. 1, 1983

[51] Int. Cl.³ .............................................. H02P 6/02
[52] U.S. Cl. ..................................... 318/254; 318/138; 318/439
[58] Field of Search .................. 318/138, 254 A, 254, 318/439, 563

[56] References Cited

U.S. PATENT DOCUMENTS

| | | | |
|---|---|---|---|
| 3,483,455 | 12/1969 | Klysa et al. | 318/563 X |
| 4,031,463 | 6/1977 | Norberg | 318/138 X |
| 4,262,236 | 4/1981 | Gelenius et al. | 318/439 X |
| 4,295,085 | 10/1981 | Lafuze | 318/138 X |

FOREIGN PATENT DOCUMENTS

| | | | |
|---|---|---|---|
| 52-72412 | 6/1977 | Japan | 318/254 |
| 53-20522 | 2/1978 | Japan | 318/138 |
| 55-86364 | 6/1980 | Japan | 318/254 |
| 57-68697 | 4/1982 | Japan | 318/254 |
| 1382621 | 2/1975 | United Kingdom | 318/138 |
| 2103034 | 2/1983 | United Kingdom | 318/439 |

Primary Examiner—William M. Shoop, Jr.
Assistant Examiner—Bentsu Ro

[57] ABSTRACT

In a brushless DC motor of the type having a control circuit and a plurality of position sensors, an error detector responsive to the position sensors is used to generate an error signal useful in shutting off the motor. The output signals of the position sensors provide a numerical code representative of the rotation of the rotor relative to the windings. When the numerical code deviates from a predetermined sequence, the error detector generates an error signal and the control circuit shuts off the motor.

8 Claims, 2 Drawing Figures

4,532,461

ROTOR POSITION SENSOR ERROR DETECTION

BACKGROUND OF THE INVENTION

The present invention relates generally to electric motors and more specifically to an electronic control system for a brushless DC motor.

DC brushless motors are often used in servo control systems in a wide variety of applications. Typically, brushless motors are constructed with stationary windings and a rotary permanent magnet field. The windings are commutated by solid state switches controlled in response to signals from rotor position sensors. Since the brushes and commutator of the normal DC motor are eliminated, and since commutation is controlled by solid state switches, brushless motors require sophisticated electronic motor control systems. A representative example of a brushless DC motor having an electronic control system is disclosed in U.S. Pat. No. 4,368,411, entitled "Control System for Electric Motor," issued Jan. 11, 1983, by H. Keith Kidd.

Electronic control systems for brushless DC motors typically include a plurality of sensors for sensing the relative position of the permanently magnetized rotor relative to the stator windings. The position sensors usually comprise Hall sensors and magnets, photo interrupters and a shutter wheel, or some other similar arrangement. The position sensors provide output signals which are used to control switches in a bridge circuit in order to apply current to the stator windings in an appropriate sequence. If the position sensors malfunction, the switches can apply excessive currents to the stator windings thereby causing damage to the motor.

It is an object of the present invention to provide an electronic control system which can detect errors in the output signals of the position sensors of a brushless DC motor.

It is another object of the present invention to provide an electronic control system which can shut off the brushless DC electric motor once error signals have been detected.

SUMMARY OF THE INVENTION

The apparatus of the present invention provides an electronic control system for a brushless DC motor in which errors among the output signals from a plurality of position sensors are detected. The detection of these errors is used to generate an error signal which is useful in shutting off the motor, thereby preventing excessive currents from being applied to the motor.

The error signal is generated in accordance with the output signals from a plurality of position sensors. The output signals are used to generate a numerical code representative of the position of the permanently magnetized rotor relative to the stator windings of the brushless DC motor. Each number in the code corresponds to a particular state indicative of the rotor position. As the rotor rotates relative to the windings, the output signals of the rotor position sensors provide a sequence of states which follow a predetermined order. Each present state represented by a particular numerical value is compared to a previous state to determine if the rotor position sensors are functioning correctly. If the present state does not correspond to one of the permissible states associated with the previous state, an error signal is generated and the motor is shut off.

DETAILED DESCRIPTION OF THE INVENTION

Figure 1:
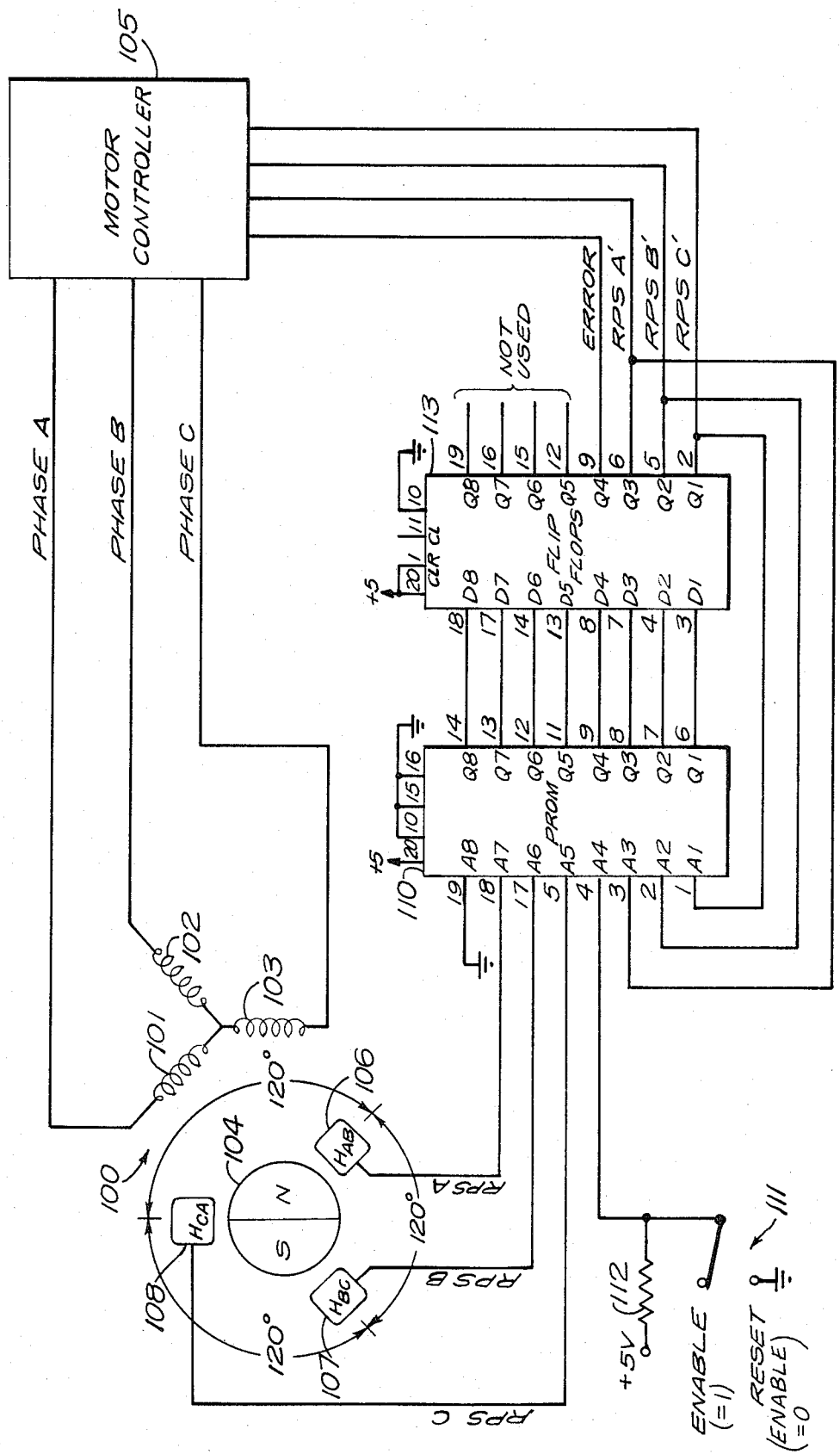
FIG. 1 is a schematic block diagram of a brushless DC motor and its associated control system which embody the present invention.

Referring to FIG. 1, a schematic block diagram of a brushless DC motor and its associated electronic control system is provided. The brushless DC motor 100 is comprised of a plurality of stator windings 101, 102, 103 connected in a wye configuration and a permanently magnetized rotor 104 having a north and a south pole. Excitation currents are applied to the stator windings 101, 102, 103 by a motor controller 105 via lines, which are designated Phase A, Phase B, and Phase C respectively. The motor controller 105 is of a type disclosed in U.S. Pat. 4,368,411, entitled "Control System for Electric Motor."

A plurality of position sensors 106, 107, 108 which are designated $H_{AB}$, $H_{BC}$, and $H_{CA}$ are disposed 120° apart in operative relationship to the permanently magnetized rotor 104. In the preferred embodiment of the present invention, the position sensors 106, 107, 108 are Hall effect sensors which are sensitive to magnetic poles associated with the rotor 104. It should be understood, however, that a different number of position sensors as well as other position detectors, such as photo interrupters and a shutter wheel coupled to the rotor 104, could be used.

The output signals from the position sensors 106, 107, 108 are coupled to address line inputs A7, A6, A5 of a PROM 110 via lines which are designated RPS A, RPS B, and RPS C. The designation RPS is an abbreviation for Rotor Position Sensor. Another input to the PROM 110 on address line input A4 is provided by a single pole single throw switch 111. One contact of switch 111 is connected to ground, the other contact is unconnected, and the wiper contact is coupled to a 5 volt source via resistor 112. The switch 111 is useful in resetting the apparatus of the present invention after an error has been detected as hereinafter described.

The PROM 110 and a plurality of D-type flip flops 113 comprise a sequential logic device which is called a state machine. The flip flops 113 are preferably a commercially available integrated circuit such as device number 74 LS 273. The $Q_1$, $Q_2$, $Q_3$, $Q_4$ output of the flip flops 113 are fed to the motor controller 105 as an error signal and as position signals designated RPS A', RPS B', and RPS C'. The $Q_1$, $Q_2$, and $Q_3$ outputs are also fed back to the PROM 110 on address line inputs A1, A2, A3. The $Q_5$, $Q_6$, $Q_7$, $Q_8$ outputs are not used.

Figure 2:
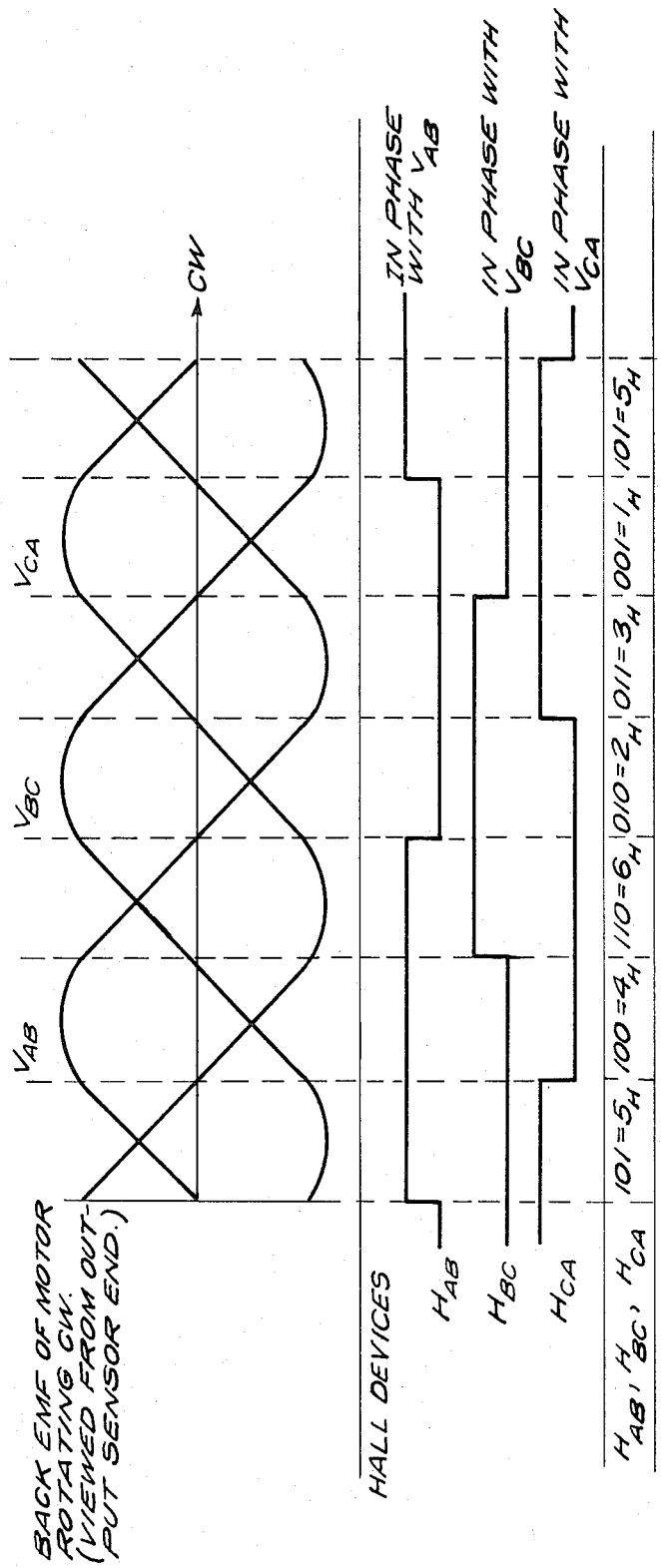
FIG. 2 is an illustration of various waveforms useful in describing the operation of the present invention.

Referring now to FIG. 2, illustrations of various waveforms useful in explaining the operation of the present invention are provided. The sinusoidal waveforms labeled $V_{AB}$, $V_{BC}$, $V_{CA}$ are illustrative of the back EMF of the brushless DC motor 100 when it is rotating in a clockwise direction. The rectangular waves designated $H_{AB}$, $H_{BC}$, $H_{CA}$ are illustrative of the output signals or RPS signals from position sensors 106, 107, 108. When the position sensors 106, 107, 108 are functioning correctly, the waveform $H_{AB}$ is in phase with $V_{AB}$, the waveform $H_{BC}$ is in phase $V_{BC}$, and the waveform $H_{CA}$ is the phase $V_{CA}$. These waveforms, therefore, may be used to generate a binary numerical code which corresponds to the changes in the output states of the position sensors 106, 107, 108.

There are six allowed operating states which can be represented by three binary digits. For example, state $4_H$ is represented by the binary number 100. During state $4_H$, $H_{AB}$ is at a logic 1, $H_{BC}$ is at a logic O, and $H_{CA}$ is at a logic O. It can be appreciated that each of the remaining states $1_H$, $2_H$, $3_H$, $5_H$ and $6_H$ all correspond to a binary number derived from logic states of waveforms $H_{AC}$, $H_{BC}$, $H_{CA}$. It can be further appreciated that a different state will precede and follow a certain given state in the logical sequence shown in FIG. 2. For example, state 101 precedes state 100 and state 110 follows 100. Accordingly, the output signals or RPS signals from the positions sensors 106, 107, 108 can be used to generate a code defining a plurality of allowed states.

The RPS signals do not include a 000 or 111 in the code, and therefore, 111 can be used as an error state. If the cable having the lines designated RPS A, RPS B, RPS C in FIG. 1 were cut or disconnected, the RPS lines would all go high or all go low, depending upon their connection. Such a condition would provide a 111 or a 000 code, both of which desirably provide an indication of an error condition. Whenever the RPS signals from the output sensors 106, 107, 108 correctly change state one of the above described binary codes may be used to represent the new state.

These various codes for state changes can be compiled into the state tables of Table I and the logic associated with the state tables may then be stored in the PROM 110. The state tables of Table I which are written in an octal notation rather than binary may be derived from the rules listed below;
If State=0 then next state=7
If State=1 and
  next state=5, then RPS=101
  next state unchanged, then RPS=001
  next state=3, then RPS=011
  All other then next state=7
If state=2 and
  next state=3, then RPS=011
  next state unchanged, then RPS=010
  next state=6, then RPS=110
  All other then next state=7
If state=3 and
  next state=1, then RPS=001
  next state unchanged, then RPS=011
  next state=2, then RPS=010
  All other then next state=7
If state=4 and
  next state=6, then RPS=110
  next state unchanged, then RPS=100
  next state=5, then RPS=101
  All other then next state=7
If state=5 and
  next state=4, then RPS=100
  next state unchanged, then RPS=101
  next state=1, then RPS=001
  All other then next state=7
If state=6 and
  next state=2, then RPS=010
  next state unchanged, then RPS=110
  next state=4, then RPS=100
  All other then next state=7
If state=7
  If enable=1 then
  output error=true
  Next state=7
  else output error=false
  next state=RPS It should be noted that switch 111 can provide the Enable=0 input to the PROM 110 and acts as a reset to get out of the error state.

The above listed rules are used in deriving the state tables of Table I, listed below:

TABLE I

| Present State | | | | Next State | | | | | | Output (Error) Error = 1, Normal = 0 | | | | | | | |
|---|---|---|---|---|---|---|---|---|---|---|---|---|---|---|---|---|---|
| | RPS Inputs | 0 | 1 | 2 | 3 | 4 | 5 | 6 | 7 | 0 | 1 | 2 | 3 | 4 | 5 | 6 | 7 |
| Enable=1 | 0 | 7 | 7 | 7 | 7 | 7 | 7 | 7 | 7 | 1 | 1 | 1 | 1 | 1 | 1 | 1 | 1 |
| | 1 | 7 | (1) | 7 | 2 | 7 | 5 | 7 | 7 | 1 | 0 | 1 | 0 | 1 | 0 | 1 | 1 |
| | 2 | 7 | 7 | (2) | 3 | 7 | 7 | 6 | 7 | 1 | 1 | 0 | 0 | 1 | 1 | 0 | 1 |
| | 3 | 7 | 1 | 2 | (3) | 7 | 7 | 7 | 7 | 1 | 0 | 0 | 0 | 1 | 1 | 1 | 1 |
| | 4 | 7 | 7 | 7 | 7 | (4) | 5 | 6 | 7 | 1 | 1 | 1 | 1 | 0 | 0 | 0 | 1 |
| | 5 | 7 | 1 | 7 | 7 | 4 | (5) | 7 | 7 | 1 | 0 | 1 | 1 | 0 | 0 | 1 | 1 |
| | 6 | 7 | 7 | 2 | 7 | 4 | 7 | (6) | 7 | 1 | 1 | 0 | 1 | 0 | 1 | 0 | 1 |
| | 7 | 7 | 7 | 7 | 7 | 7 | 7 | 7 | 7 | 1 | 1 | 1 | 1 | 1 | 1 | 1 | 1 |
| Enable=0 | 0 | 7 | 1 | 7 | 7 | 7 | 7 | 7 | 7 | 0 | 0 | 0 | 0 | 0 | 0 | 0 | 0 |
| | 1 | 7 | (1) | 2 | 3 | 4 | 5 | 6 | 7 | 0 | 0 | 0 | 0 | 0 | 0 | 0 | 0 |
| | 2 | 7 | 1 | (2) | 3 | 4 | 5 | 6 | 7 | 0 | 0 | 0 | 0 | 0 | 0 | 0 | 0 |
| | 3 | 7 | 1 | 2 | (3) | 4 | 5 | 6 | 7 | 0 | 0 | 0 | 0 | 0 | 0 | 0 | 0 |
| | 4 | 7 | 1 | 2 | 3 | (4) | 5 | 6 | 7 | 0 | 0 | 0 | 0 | 0 | 0 | 0 | 0 |
| | 5 | 7 | 1 | 2 | 3 | 4 | (5) | 6 | 7 | 0 | 0 | 0 | 0 | 0 | 0 | 0 | 0 |
| | 6 | 7 | 1 | 2 | 3 | 4 | 5 | (6) | 7 | 0 | 0 | 0 | 0 | 0 | 0 | 0 | 0 |
| | 7 | (7) | 1 | 2 | 3 | 4 | 5 | 6 | (7) | 1 | 1 | 1 | 1 | 1 | 1 | 1 | 1 |

The circles represent stable states, i.e., where the next state equals the present state.

The logic from the state tables of Table I can be stored in the PROM 110 or it could be implemented with discrete logic circuits. In the preferred embodiment of the present invention, the PROM 110 is used instead of discrete logic circuits, and this results in a decrease in the number of parts necessary to practice the invention.

The contents of the PROM 110 is provided in Table II listed below:

TABLE II

PROM DATA TABLE

| Inputs A1-A4 | \- Inputs A5-A8 | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | 7 | 1 | 2 | 3 | 4 | 5 | 6 | 7 | 0 | 0 | 0 | 0 | 0 | 0 | 0 | 0 |
| 1 | 7 | 1 | 2 | 3 | 4 | 5 | 6 | 7 | 0 | 0 | 0 | 0 | 0 | 0 | 0 | 0 |
| 2 | 7 | 1 | 2 | 3 | 4 | 5 | 6 | 7 | 0 | 0 | 0 | 0 | 0 | 0 | 0 | 0 |
| 3 | 7 | 1 | 2 | 3 | 4 | 5 | 6 | 7 | 0 | 0 | 0 | 0 | 0 | 0 | 0 | 0 |
| 4 | 7 | 1 | 2 | 3 | 4 | 5 | 6 | 7 | 0 | 0 | 0 | 0 | 0 | 0 | 0 | 0 |
| 5 | 7 | 1 | 2 | 3 | 4 | 5 | 6 | 7 | 0 | 0 | 0 | 0 | 0 | 0 | 0 | 0 |
| 6 | 7 | 1 | 2 | 3 | 4 | 5 | 6 | 7 | 0 | 0 | 0 | 0 | 0 | 0 | 0 | 0 |
| 7 | 7 | 1 | 2 | 3 | 4 | 5 | 6 | 7 | 0 | 0 | 0 | 0 | 0 | 0 | 0 | 0 |
| 8 | F | F | F | F | F | F | F | F | 0 | 0 | 0 | 0 | 0 | 0 | 0 | 0 |
| 9 | F | 1 | F | 3 | F | 5 | F | F | 0 | 0 | 0 | 0 | 0 | 0 | 0 | 0 |
| A | F | F | 2 | 3 | F | F | 6 | F | 0 | 0 | 0 | 0 | 0 | 0 | 0 | 0 |
| B | F | 1 | 2 | 3 | F | F | F | F | 0 | 0 | 0 | 0 | 0 | 0 | 0 | 0 |
| C | F | F | F | F | 4 | 5 | 6 | F | 0 | 0 | 0 | 0 | 0 | 0 | 0 | 0 |
| D | F | 1 | F | F | 4 | 5 | F | F | 0 | 0 | 0 | 0 | 0 | 0 | 0 | 0 |
| E | F | F | 2 | F | 4 | F | 6 | F | 0 | 0 | 0 | 0 | 0 | 0 | 0 | 0 |
| F | F | F | F | F | F | F | F | F | 0 | 0 | 0 | 0 | 0 | 0 | 0 | 0 |

Table of outputs Q1–Q4 for PROM 110
Notes:
(1) Outputs Q5–Q8 not used, set at "F" for all input states,
(2) All values in Hexadecimal Notation.

Referring back to FIG. 1, it can be appreciated that in operation the Hall sensors or position sensors 106, 107, 108 provide output or RPS signals A,B,C which are used to address the PROM 110 and are stored in the flip flops 113. In order to detect an error, the present invention compares each present state of the RPS signals with the previous state stored in the flip flops 113. If an illegal transition has occurred, then an error will be detected and the device will go into an error state. Errors are detected when there is an open in any RPS line; a short to ground, i.e., a Hall sensor 106, 107, 100 failing shorted; or a short between RPS lines. An error signal will then be sent from the flip flops 113 to motor controller 105 thereby causing the motor to shut off. The device will remain in an error state until the switch 111 is reset.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A brushless D.C. motor control system comprising:
   a brushless D.C. motor which includes a stator having a plurality of windings and a rotor;
   a plurality of position sensors disposed about said rotor to provide digital position signals indicative of the position of said rotor relative to said stator;
   a control circuit responsive to the digital position signals for commutating said windings; and
   a protection circuit responsive to said position sensors for detecting a logical error among the digital position signals and for providing said control circuit with an error signal to shut off said motor when such logical errors are detected.

2. A control system according to claim 1 wherein said protection circuit includes sequential logic means for comparing the present state of the digital position signals to the previous state of the digital position signals and for providing the error signal when the present state of digital position signals deviates from a predetermined sequence.

3. A control system according to claim 1 wherein said protection circuit includes memory means responsive to the digital position signals.

4. A control system according to claim 3 which further includes switching means for resetting said memory means.

5. A control system according to claim 4 wherein said position sensors include a plurality of Hall sensors disposed equiangularly about said rotor.

6. A control system according to claim 5 wherein said memory means includes a programmable read only memory.

7. A control system according to claim 6 wherein said memory means includes a plurality of D-type flip flops.

8. A control system according to claim 7 wherein said programmable read only memory includes feedback means responsive to said D-type flip flops.

* * * * *